US006603568B1

(12) United States Patent
Sansone

(10) Patent No.: US 6,603,568 B1
(45) Date of Patent: Aug. 5, 2003

(54) SYSTEM AND METHOD FOR ISSUING ELECTRONIC TICKETS

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/575,312

(22) Filed: May 19, 2000

(51) Int. Cl.[7] ........................ G06F 15/00; G06F 17/60; B42D 15/00

(52) U.S. Cl. ....................... 358/1.14; 705/57; 358/1.15; 283/72

(58) Field of Search ................................ 358/1.15, 1.9, 358/1.14, 1.17, 1.1, 1.6, 1.4, 1.2, 442, 468, 448, 401; 283/113, 93, 72, 61, 62, 903; 399/366; 380/54, 55

(56) References Cited

U.S. PATENT DOCUMENTS

| | | | | | |
|---|---|---|---|---|---|
| 3,675,948 | A | * | 7/1972 | Wicker | 283/6 |
| 4,210,346 | A | * | 7/1980 | Mowry, Jr. et al. | 283/8 B |
| 4,299,637 | A | * | 11/1981 | Oberdeck et al. | 156/64 |
| 4,668,597 | A | * | 5/1987 | Merchant | 430/22 |
| 5,291,243 | A | | 3/1994 | Heckman et al. | 355/201 |
| 5,313,564 | A | * | 5/1994 | Kafri et al. | 395/101 |
| 5,396,559 | A | * | 3/1995 | McGrew | 380/54 |
| 5,398,932 | A | * | 3/1995 | Eberhardt et al. | 273/138 |
| 5,444,518 | A | | 8/1995 | Hashiguchi et al. | 355/201 |
| 5,537,223 | A | * | 7/1996 | Curry | 358/460 |
| 5,682,819 | A | * | 11/1997 | Beaty | 101/483 |
| 5,721,788 | A | * | 2/1998 | Powell et al. | 382/100 |
| 5,734,752 | A | * | 3/1998 | Knox | 382/212 |
| 5,754,933 | A | * | 5/1998 | Orndorff | 399/366 |
| 5,769,458 | A | * | 6/1998 | Carides et al. | 283/102 |
| 5,772,250 | A | | 6/1998 | Gasper | 283/114 |
| 5,822,436 | A | | 10/1998 | Rhoads | 380/54 |
| 5,899,504 | A | * | 5/1999 | Fabel | 283/109 |
| 6,101,602 | A | * | 8/2000 | Fridrich | 713/176 |
| 6,104,812 | A | * | 8/2000 | Koltai et al. | 380/51 |
| 6,142,533 | A | * | 11/2000 | Borowski, Jr. | 283/111 |
| 6,145,885 | A | * | 11/2000 | Scrymgeour et al. | 283/94 |
| 6,155,491 | A | * | 12/2000 | Dueker et al. | 253/486 |
| 6,229,621 | B1 | * | 5/2001 | Kulakowski et al. | 358/1.15 |
| 6,256,736 | B1 | * | 7/2001 | Coppersmith et al. | 713/176 |
| 6,305,718 | B1 | * | 10/2001 | Kendrick | 283/93 |
| 2002/0029253 | A1 | * | 3/2002 | Rhoads | 709/217 |
| 2002/0099943 | A1 | * | 7/2002 | Rotrigues et al. | 713/176 |

FOREIGN PATENT DOCUMENTS

| | | | |
|---|---|---|---|
| EP | 0661674 A1 | * | 5/1995 |
| JP | 408244389 A | * | 9/1996 |
| JP | 409314980 | * | 12/1997 |

* cited by examiner

*Primary Examiner*—Madeleine Nguyen
(74) *Attorney, Agent, or Firm*—Ronald Reichman; Angelo N. Chaclas

(57) ABSTRACT

This invention adds a graphic field to an electronic ticket. The graphic field is designed to produce a "tell" a visible known image (a large number of detectable halftone gray steps) when printed by a personal computer printer. Additionally, the graphic field will change in appearance when the ticket originally printed by the personal computer printer is digitally reproduced by either scanning or photocopying. The foregoing makes it more difficult to copy and/or forge the ticket.

11 Claims, 5 Drawing Sheets

SYSTEM AND METHOD FOR ISSUING ELECTRONIC TICKETS

CROSS REFERENCE TO RELATED APPLICATIONS

Reference is made to commonly assigned copending patent application Ser. No. 09/575,354 filed herewith entitled "A Method For Printing Electronic Tickets" in the name of Ronald P. Sansone, Ser. No. 09/573,364 filed herewith entitled "A Method For Reading Electronic Tickets" in the name of Ronald P. Sansone; and Ser. No. 09/575,314 filed herewith entitled "A Method For Automatically Reading Electronic Tickets" in the name of Ronald P. Sansone.

FIELD OF THE INVENTION

The subject invention relates to a method for issuing tickets at remote locations and, more particularly, to issuing tickets at remote locations that are difficult to be reproduced fraudulently.

BACKGROUND OF THE INVENTION

Tickets such as concert, theater, movie, museum, trade show, airline and sports tickets, etc, are documents having a substantial, intrinsic value which typically may be presented by any bearer to gain admittance or exercise an entitlement. Since such tickets may have substantial cash value, there exists a continuing problem of preventing the issuance of fraudulent tickets.

The issuance of many types of tickets, such as theater tickets, is currently controlled by means of controlled supplies (e.g. serialized ticket stock, specially printed ticket stock, etc.) and by allowing tickets to be issued only by controlled, authorized issuers (e.g. ticket agents). Controlled supplies are expensive, difficult to control, and prone to theft or counterfeiting. Typically, one stood in line to purchase a ticket at the place the event was being held or purchased the ticket over the phone from an authorized ticket agent who mailed the ticket to the purchaser.

Currently, ticketing companies are giving purchasers the option of printing their electronic tickets at home, using ordinary paper, a personal computer printer and an Internet connection. One of the problems in allowing people to print tickets at home is to ensure that the tickets are not counterfeit. One of the solutions suggested to solve the foregoing problem is to print an encrypted bar code on the ticket. Unfortunately, a printed ticket on ordinary paper with an encrypted bar code can be photocopied and the seller of the ticket will be unable to distinguish between the original real ticket and the photocopied ticket.

SUMMARY OF THE INVENTION

This invention overcomes the disadvantages of the prior art by adding a graphic field to the electronic ticket. The graphic field is designed to produce a "tell", a visible known image (a large number of detectable half-tone gray steps) when printed by a personal computer printer. Additionally, the graphic field will change in appearance when the ticket originally printed by the personal computer printer is digitally reproduced either by scanning or photocopying.

The digital scanning and photocopying processes are degrading ones that reduce the number of detectable half-tone gray steps produced in the copy. These processes also give rise to a pronounced mottle at the transition zone from white to black that does not exist in the original printed electronic ticket. The loss of some of the gray steps in the graphic field will indicate to an observer that the reproduced ticket is counterfeit.

This invention takes advantage of the fact that the human eye cannot resolve the individual spots in the intermediate gray zone that is somewhere between white and black. The human eye interprets the intermediate patch of adjacent spots in the gray zone as a particular shade of gray, when, in fact, the adjacent spots in the gray zone are black spots that vary in size due to process variations introduced by the photocopying and/or scanning processes. The human eye is very sensitive to slight changes of grayness in the intermediate gray zone region. The human eye is very sensitive to miniscule variations in the apparent grayness of the patch. Consequently, the human eye will be able to observe that the graphic field, or tell, on an electronic ticket will change in appearance when the ticket originally printed by the personal computer printer is either digitally reproduced by scanning or photocopied. Thus, the human eye will be able to determine when a copied electronic ticket is a fake ticket.

DETAILED DESCRIPTION OF PREFERRED EMBODIMENTS OF THE INVENTION

Figure 1:
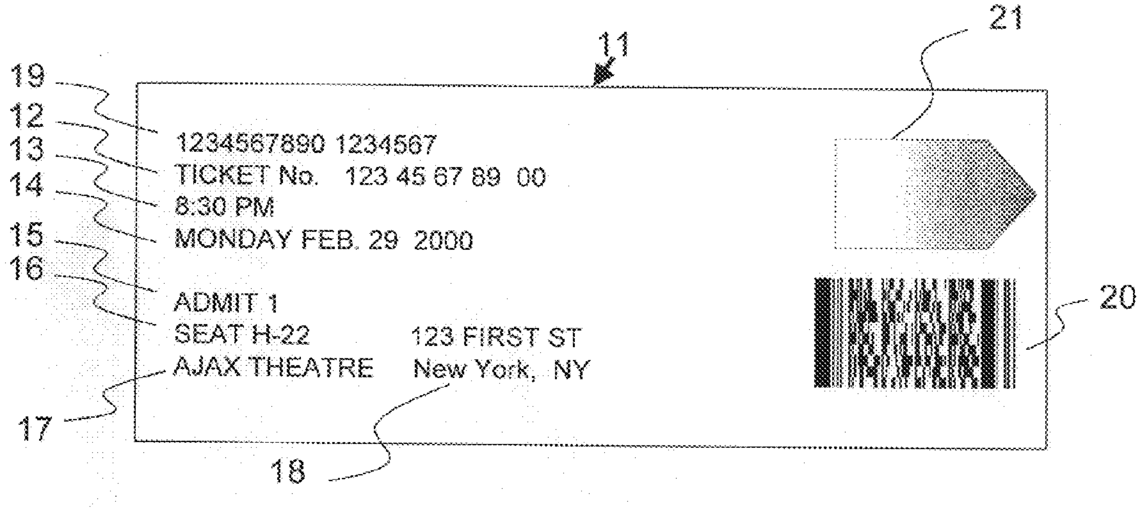
FIG. 1 is a drawing of an electronic ticket having a graphic field or tell.

Referring now to the drawings in detail, and more particularly to FIG. 1, the reference character 11 represents an electronic ticket that may be used for admission to any place, service, or event that current ticket allows admission. Electronic ticket 11 may have been produced by a printer coupled to a computer or by a printer of an electronic postage meter or automatic teller machine (ATM) printer. Ticket 11 includes: a serial number 12, the time 13 of the event the ticket holder is entitled to admission, the date of the event 14, the number of people designated to admit, or the names of the people allowed admission 15, the ticket holder(s) seat number 16, the name of the place of the event 17, the address of the event 18, a unique number 19 that represents a computer record, a bar code 20, which may be a two dimensional encrypted bar code i.e., the PDF417 standard developed by Symbol Technologies Inc. of Bohemia, N.Y., and graphic field or tell 21. Bar code 20 contains, in coded form, the name of the place of the event 17, the address of the event 18, and a unique number 19.

Figure 2:
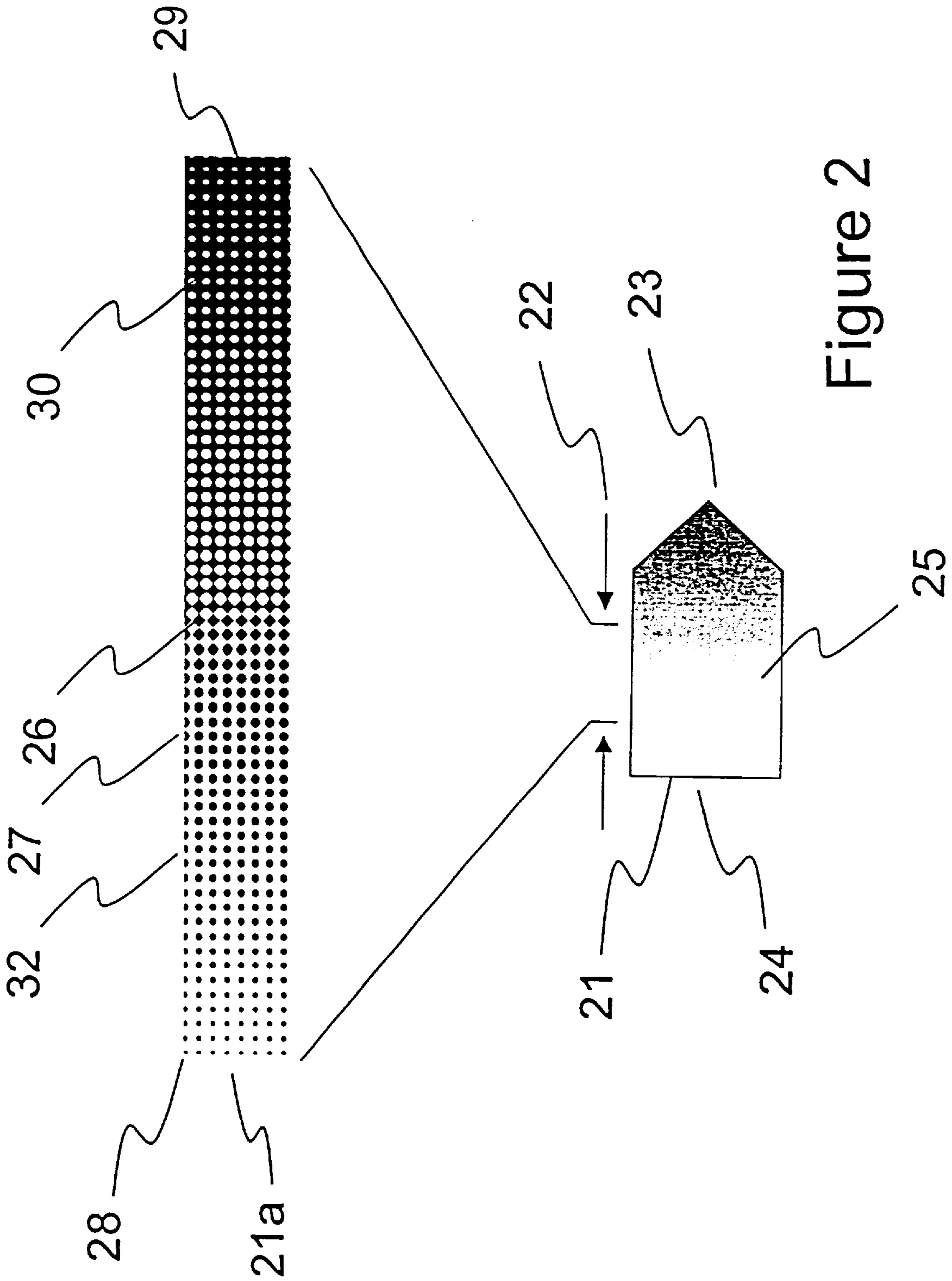
FIG. 2 is a drawing of graphic field 21 or tell 21 of FIG. 1 and an enlarged version of graphic field 21 that becomes graphic field 21*a;*

FIG. 2 is a drawing of graphic field 21 or tell 21 of FIG. 1 and an enlarged version of graphic field 21 that becomes graphic field 21*a*. Graphic field 21 or tell 21 is a variable half tone screen print that is designed to appear black at its edge 23, near white at its edge 24, and shades of gray in region 25. Section 22 of graphic field 21 is an enlarged version of region 25. Section 22 shows the effect of varying the black printed spots 26 and white background 27. White background 27 decreases in size from edge 28 to edge 29. Within region 30, white background 27 becomes completely surrounded by black spots 26. Within region 32 white background 27 appears to increase in size as one approaches edge 28.

Half toning is the process used to produce graphic field 21. Half toning is a technique that is used by printers to represent a gray scale image on a bi-level (black and white) page. Half toning breaks up an image into spots of varying sizes to simulate the original image. The eye perceives a shade of gray depending on the percentage of ink coverage. Black and white laser and ink jet computer printers use ink or toner of only one blackness. Therefore, to produce various shades of gray to reproduce a continuous gray scale image, the image is broken into a series of spots. Varying the spot sizes approximates the shades of gray.

Thus, a group of large spots placed closely together appears black. A group of smaller spots with larger spaces between them produces a pale gray shade. A group of even smaller black spots spaced widely apart would appear almost white.

Graphic field 21 consists of a continuously varying tone area. A field where the range of tone has been pre-selected to provide a continuum of spots that slowly vary from small white backgrounds with large black spots to small black spots on a white background. Small is defined as being below the resolution limit of the human eye. When printed by a laser or ink jet printer graphic field 21 appears black at its edge 23, near white at its edge 24, and shades of gray in region 25.

Figure 3:
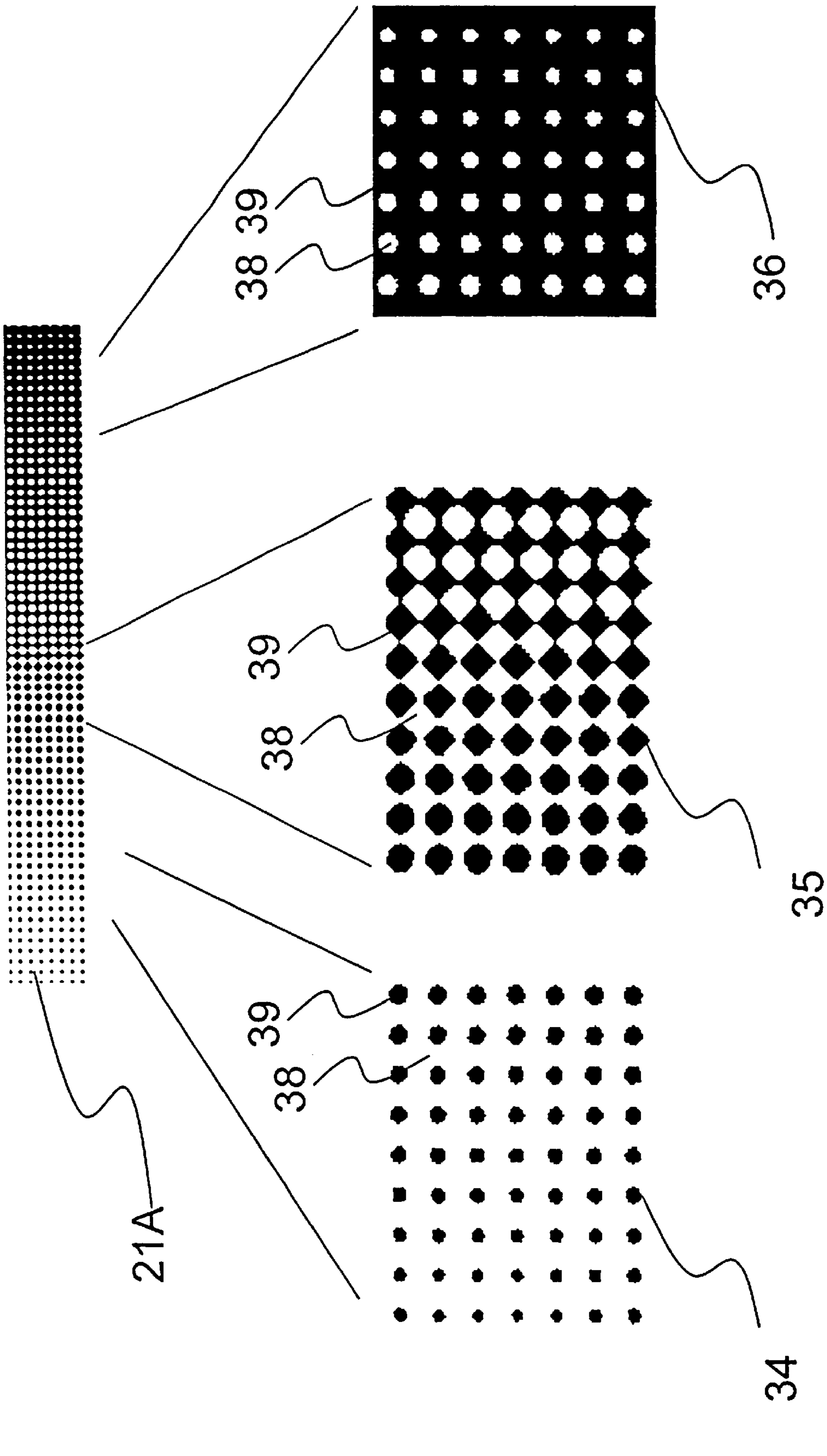
FIG. 3 is a drawing showing graphic field 21*a* and segments 34, 35 and 36 that make up an enlarged version of graphic field 21*a;*

FIG. 3 is a drawing showing graphic field 21*a* and segments 34, 35 and 36 that make up an enlarged version of graphic field 21*a*. Within region 36, white background 38 becomes completely surrounded by black spots 39. Within region 35, white background 38 appears as white open areas at its left edge and white squares at its right edge. Within region 34, white background 38 completely surrounds varying size black spots 39.

Figure 4:
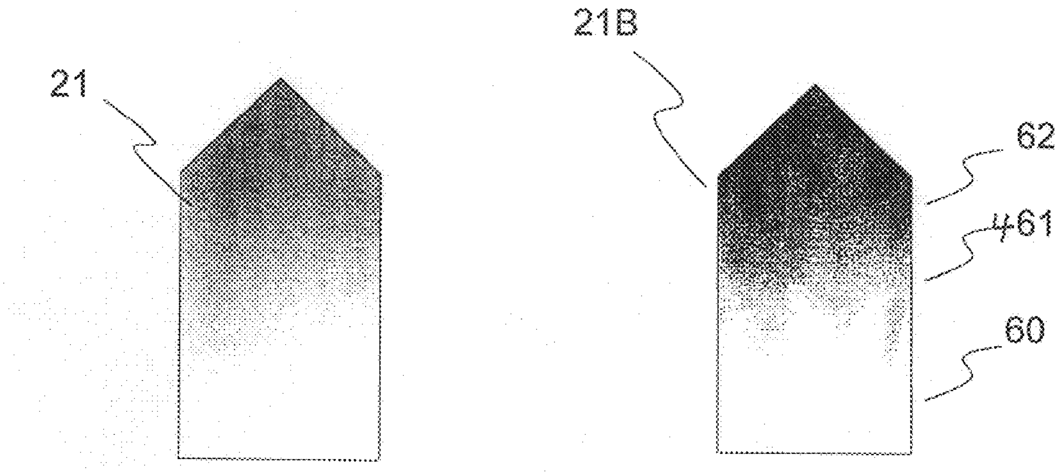
FIG. 4 is a drawing showing graphic field 21 and how graphic field 21 would be distorted by the photocopying and/or scanning/printing process to look like graphic field 21*b.

FIG. 4 is a drawing showing graphic field 21 and how graphic field 21 would be distorted by the photocopying and/or scanning/printing process to look like graphic field 21*b*. The original print tone of graphic field 21 is uniform gray gradient. When graphic field 21 is photocopied and/or scanned/printed graphic field 21*b* will vary from black to white. Graphic field 21*b* will have visible bands 60, a mottled area 461 and an expanded black tone area 62. Thus, graphic field 21 does not look the same as graphic field 21*b*.

Laser and ink jet printers would print graphic field 21 as described in the description of FIGS. 2 and 3. The aforementioned printers are designed in a manner such that when they print graphic field 21, graphic field 21 appears to the average human eye to be free of objectionable variation. The printers are not concerned how a photocopy and/or how a scanned/printed copy of graphic field 21 would look. However, the non-linear reproduction characteristics of a photocopier and/or a scanner/printer will magnify these non-perceivable, process-produced variations in graphic field 21 and produce graphic field 21*b*. The peculiarities of the human eye further magnify the now visible process errors. The errors manifest themselves as mottled area 461 in graphic field 21*b*, while in region 25 of graphic field 21, a smooth gray tone exists.

Figure 5:
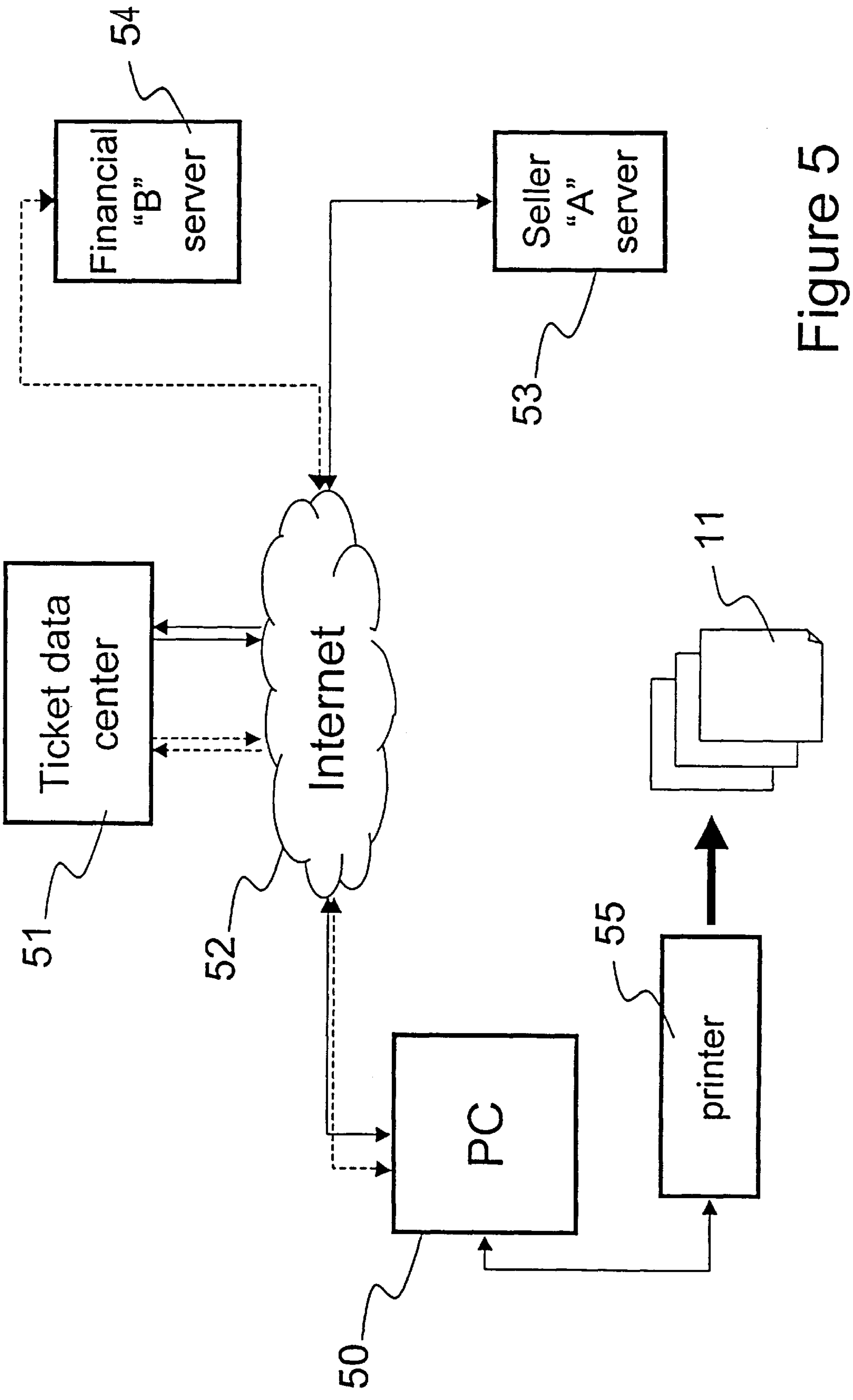
* and FIG. 5 is a drawing showing how tickets may be purchased over the Internet.

FIG. 5 is a drawing showing how tickets may be purchased over the Internet. A purchaser wishing to obtain an electronic ticket, inputs information through input device 50, which may be a personal computer, or a non-intelligent terminal device, or any other suitable input device, to data center 51 via internet 52. Data center 51 communicates with a ticket seller server 53 via internet 52 to obtain information as to the availability of suitable events consistent with what the purchaser desires. Server 53 will handle all the specifics that the ticket entitles one to receive. Server 53 will also handle the payment for the ticket, i.e., credit card. Server 53 also communicates with financial server 54 and data center 51 to validate payment information. If the purchaser wants to purchase the ticket(s) that server 53 has available at the price specified by server 53, and server 54 is satisfied with the purchaser's credit, server 53 will inform data center 51 of these facts. Data center 51 will compose ticket 11. Data center 51 will download the purchased ticket(s) to computer 50. Personal computer printer 55 (laser, ink jet, facsimile machine) will print ticket(s) 11.

Graphic field 21 or tell 21 will be printed on ticket 11 as shown in FIG. 1. If ticket 21 is reproduced by photocopying and/or scanning/printing, graphic field 21 will display a mottle image 461, as shown in FIG. 4. Thus, a ticket agent will be able to visualize when a ticket is a copy.

The above specification describes a new and improved system and method for producing a tell on an electronic ticket. It is realized that the above description may indicate to those skilled in the art additional ways in which the principles of this invention may be used without departing from the spirit. Therefore, It is intended that this invention be limited only by the scope of the appended claims.

What is claimed is:

1. A method for producing electronic tickets on ordinary paper, comprising the steps of:

recording information about the ticket on the ticket; and recording a graphic field on the ticket that will change in appearance when the ticket is either reproduced by scanning/printing and/or photocopying, wherein the graphic field is a plurality of detectable half-tone grey steps when printed by a personal computer printer, wherein a human eye will perceive the graphic field to vary from black to gray to white.

2. The method claimed in claim 1, wherein the recording the graphic field step, further includes the steps of:

printing a continuum of spots that slowly vary from small white backgrounds with large black spots to small black spots on a white background.

3. The method claimed in claim 2, wherein the size of the spots are below the resolution limit of the human eye.

4. The method claimed in claim 1, wherein the scanning/printing and/or photocopying process will produce mottle in a gray zone in the graphic field.

5. The method claimed in claim 1, wherein the scanning/printing and/or photocopying process will produce bands in the graphic field.

6. The method claimed in claim 1, wherein the electronic ticket may be ordered and transmitted over the internet.

7. A system for issuing tickets, comprising:

a) a data processing system that is coupled to the internet for:

a1) receiving ticket request information; and, a2) generating ticket information; said ticket information including graphic field information; and b) a local printing system for:

a1) receiving said ticket information; and, a2) printing on ordinary paper the graphic field for the ticket in a manner that the graphic field will change in appearance when the ticket is either reproduced by scanning/printing and/or photocopying, wherein the graphic field is a plurality of detectable half-tone grey steps when printed by a personal computer printer, wherein a human eye will perceive the graphic field to vary from black to gray to white.

8. The system claimed in claim 7, wherein a laser or ink jet printer prints the graphic field as a continuum of spots that slowly vary from small white backgrounds with large black spots to small black spots on a white background.

9. The system claimed in claim 8, wherein the size of the spots is below the resolution limit of the human eye.

10. The system claimed in claim 7, wherein the scanning/printing and/or photocopying process will produce mottle in a gray zone in the graphic field.

11. The system claimed in claim 7, wherein the scanning/printing and/or photocopying process will produce bands in the graphic field.

* * * * *